US006579165B2

(12) United States Patent
Kuhlin et al.

(10) Patent No.: US 6,579,165 B2
(45) Date of Patent: Jun. 17, 2003

(54) COIN BAG SUPPORT SYSTEM

(75) Inventors: Steven S. Kuhlin, Lake Zurich, IL (US); John R. Blake, St. Charles, IL (US)

(73) Assignee: Cummins-Allison Corp., Mount Prospect, IL (US)

( * ) Notice: Subject to any disclaimer, the term of this patent is extended or adjusted under 35 U.S.C. 154(b) by 23 days.

(21) Appl. No.: 09/795,757

(22) Filed: Feb. 28, 2001

(65) Prior Publication Data

US 2002/0151267 A1 Oct. 17, 2002

(51) Int. Cl.[7] ............................ G07D 3/00; G07F 1/04; F16M 11/24

(52) U.S. Cl. ..................... 453/3; 193/DIG. 1; 194/344; 248/346.01; 248/157

(58) Field of Search ..................... 453/3, 36; 193/35 C, 193/35 F, DIG. 1; 194/344, 350, 35 B; 248/95, 97, 127, 128, 157, 423, 346.01, 346.02; 221/282, 286, 304, 312 R; 220/890, 918, 919; 232/1 D, 55

(56) References Cited

U.S. PATENT DOCUMENTS

| | | | | | |
|---|---|---|---|---|---|
| 1,225,866 | A | * | 5/1917 | Schrears | 248/97 |
| 2,324,596 | A | * | 7/1943 | Quain | 108/28 |
| 3,695,279 | A | | 10/1972 | Black et al. | 133/3 |
| 3,888,442 | A | * | 6/1975 | Comeaux | 248/98 |
| 3,998,237 | A | | 12/1976 | Kressin et al. | 133/3 A |
| 4,147,175 | A | | 4/1979 | Webb | 133/3 D |
| 4,383,540 | A | | 5/1983 | De Meyer et al. | 133/3 H |
| 4,506,685 | A | | 3/1985 | Childers et al. | 133/3 A |
| 4,593,709 | A | | 6/1986 | Duplessy | 133/3 D |
| 4,594,664 | A | | 6/1986 | Hashimoto | 364/405 |
| 4,620,559 | A | | 11/1986 | Childers et al. | 133/3 A |
| 4,681,128 | A | | 7/1987 | Ristvedt et al. | 453/6 |
| 4,863,414 | A | | 9/1989 | Ristvedt et al. | 453/6 |
| 5,022,889 | A | | 6/1991 | Ristvedt et al. | 453/6 |
| 5,131,499 | A | * | 7/1992 | Hoar | 186/66 |
| 5,443,419 | A | | 8/1995 | Adams et al. | 453/17 |
| 5,501,632 | A | * | 3/1996 | Adams et al. | 453/3 |
| 5,620,079 | A | | 4/1997 | Molbak | 194/217 |
| 5,830,056 | A | | 11/1998 | Adams et al. | 453/63 |
| 5,850,966 | A | * | 12/1998 | Siler et al. | 232/15 |
| 5,865,673 | A | | 2/1999 | Geib et al. | 453/10 |
| 5,997,395 | A | | 12/1999 | Geib et al. | 453/10 |
| 6,017,270 | A | | 1/2000 | Ristvedt et al. | 453/5 |
| 6,131,625 | A | | 10/2000 | Casanova et al. | 141/314 |
| 6,139,418 | A | | 10/2000 | Geib et al. | 453/10 |

FOREIGN PATENT DOCUMENTS

| | | | | | |
|---|---|---|---|---|---|
| EP | 0 391 403 | A3 | | 10/1990 | |
| EP | 0 391 403 | A2 | | 10/1990 | |
| GB | 2 128 795 | | | 5/1984 | |
| GB | 2 193 364 | | | 2/1988 | |
| JP | 5-174235 | A | * | 7/1993 | G07F/9/00 |
| JP | 844924 | | | 2/1996 | |
| JP | 844925 | | | 2/1996 | |
| WO | 99/33030 | | | 7/1999 | G07D/3/00 |

OTHER PUBLICATIONS

Brochure; "MACH 7/High–Speed Coin Sorter/Counter", Brandt, Bensalem, PA, 2 pp.

International Search Report, International Searching Authority, May 13, 2002.

* cited by examiner

*Primary Examiner*—Donald P. Walsh
*Assistant Examiner*—Mark J. Beauchaine
(74) *Attorney, Agent, or Firm*—Jenkens & Gilchrist

(57) ABSTRACT

A coin processing machine comprises a coin processing region for processing coins, a coin receiving region for receiving coins processed from the coin processing region, and a modular coin bag supporting device. The coin receiving region includes a bag clamping mechanism for holding a coin bag and a bag-support surface located below the bag clamping mechanism. The modular coin bag supporting device is adapted to be positioned on the bag-support surface.

34 Claims, 6 Drawing Sheets

COIN BAG SUPPORT SYSTEM

FIELD OF THE INVENTION

The present invention relates generally to coin processing devices and, more particularly, to a coin bag support mechanism for use with a coin processing device for bagging coins.

BACKGROUND OF THE INVENTION

Coin sorting machines generally have the ability to receive bulk coins of many denominations from a user or operator of the machine and to sort the coins into individual denominations and deposit the sorted coins into containers corresponding to each respective denomination as sorted. A common type of container for holding sorted coins is the coin bag. When these containers have reached their capacity, the operator of the coin sorter must then physically remove the full container and replace it with an empty container so that the machine can be returned to its operational state.

There are a variety of different sized coin bags available to users of coin sorting machines. Different sized coin bags represent a different quantity of coins and a correspondingly different value. For example, a full 15 inch (38.10 cm) coin bag holds a greater quantity of U.S. quarters than a full 12 inch (30.48 cm) coin bag.

Different coin processing applications require different sized coin bags. For example, in a casino environment, it may be desirable to accommodate one coin bag size that can hold the number of coins corresponding to a "hopper fill bag," which contains a known amount of tokens/coins so that a gaming machine can be filled with the bag and can discharge payouts to users who have won a jackpot. Also in the casino environment, it may be desirable to use a different size of coin bag as required for deposit at a bank.

One drawback associated with prior art coin sorters is their inability to accommodate more than one size of coin bag. Accommodating different sized coin bags is desirable from an operator's standpoint as the operator may require different sized coin bags for different coin processing applications. Accommodating different sized coin bags is also desirable from a manufacturer's standpoint, as the manufacturer need only build one type of coin sorter which can accommodate many different sizes of coin bags as opposed to building a different coin sorter (or different sized coin sorter housings) corresponding to each size of coin bag available. It is not practical nor desirable to use smaller sized coin bags with a sorter designed to accommodate larger sized coin bags because in this situation, the bottom of the smaller sized coin bag is unsupported and the coin bags have a tendency to tear when filled if unsupported. Therefore, a need exists for a coin sorter that can easily accommodate different sized coin bags.

SUMMARY OF THE INVENTION

A coin processing machine comprises a coin processing region for processing coins, a coin receiving region for receiving coins processed from the coin processing region, and a modular coin bag supporting device. The coin receiving region includes a bag clamping mechanism for holding a coin bag and a bag-support surface located below the bag clamping mechanism. The modular coin bag supporting device is adapted to be positioned on the bag-support surface.

The above summary of the present invention is not intended to represent each embodiment, or every aspect, of the present invention. Additional features and benefits of the present invention will become apparent from the detailed description, figures, and claim set forth below.

BRIEF DESCRIPTION OF THE DRAWINGS

The forgoing and other advantages of the invention will become apparent upon reading the following detailed description and upon reference to the drawings in which.

FIGS. *5a* and *5b* are perspective views of a coin bag support system according to an alternative embodiment of the present invention.

Figure 1:
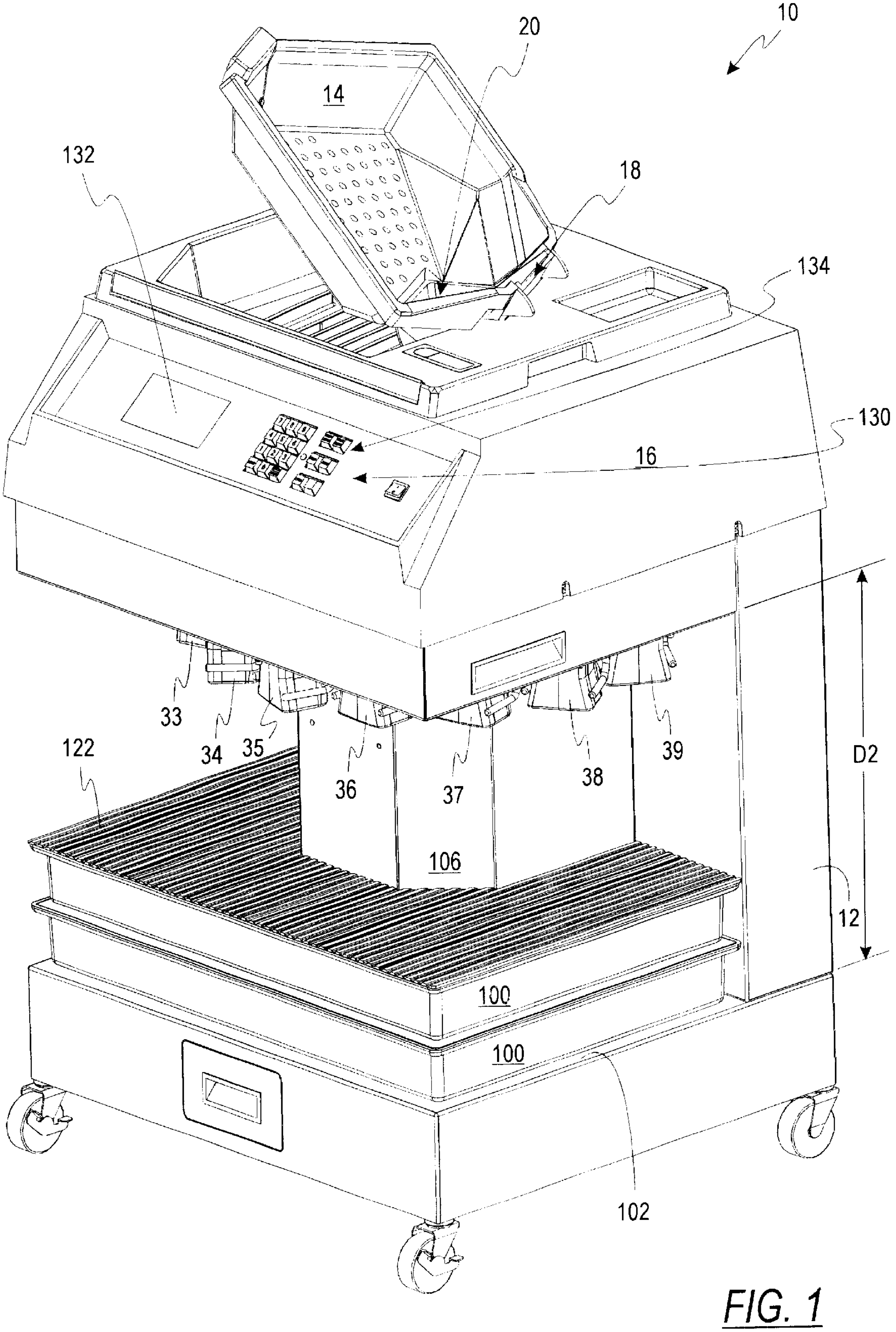
FIG. 1 is a perspective view of a coin sorter having a coin bag support system according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed herein. Rather, the invention is to cover all modifications, equivalents, and alternatives falling within the spirit and scope of the invention as defined by the appended claims.

DESCRIPTION OF THE ILLUSTRATIVE EMBODIMENTS

Figure 2:
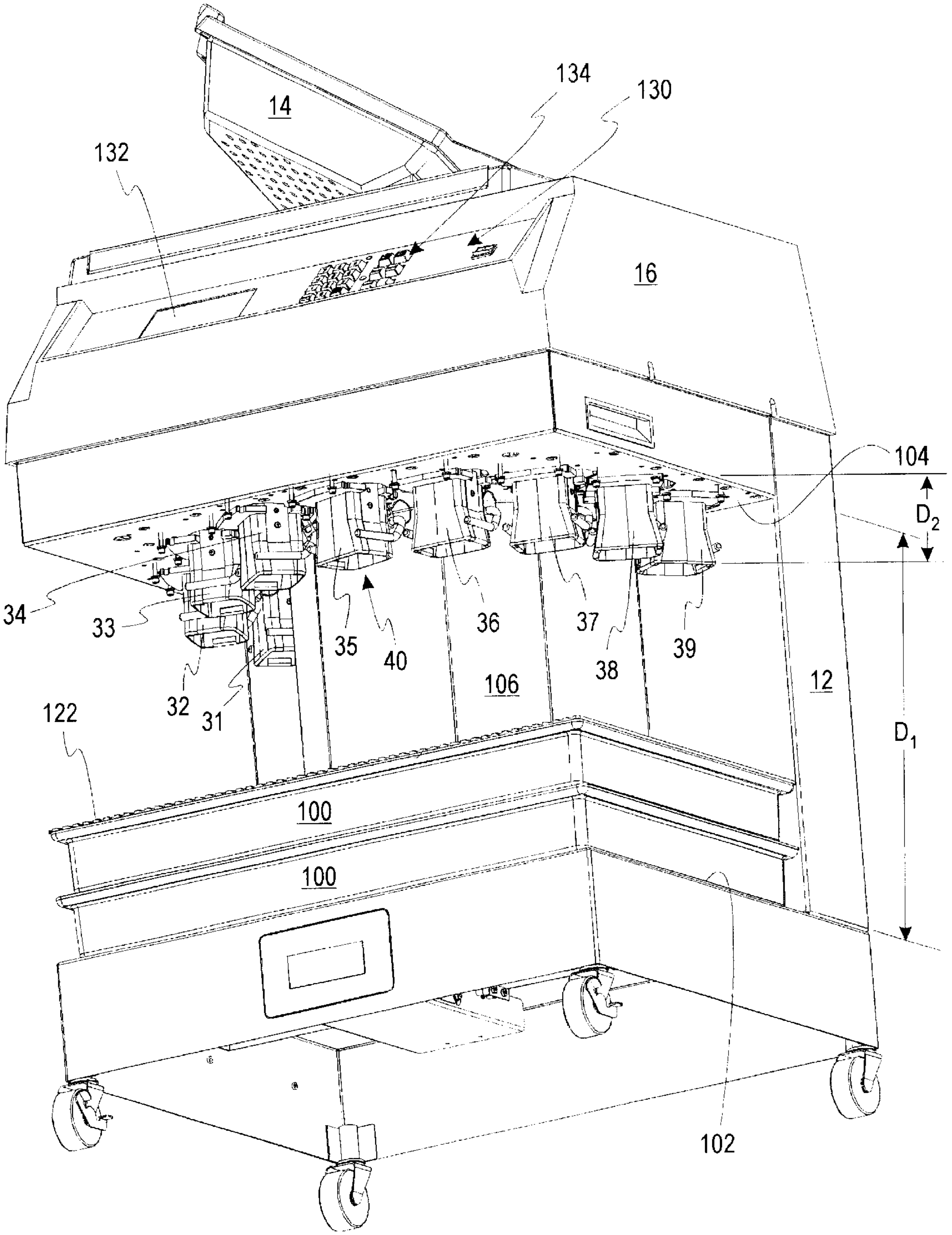
FIG. 2 is another perspective view of the coin sorter having a coin bag support system illustrated in FIG. 1 according to one embodiment of the present invention.

Referring now to the drawings and initially to FIGS. 1 and 2, there is shown a coin processing system 10 disposed on a cabinet 12 that supports the coin processing system 10 as well as houses some of the components of the coin processing system 10. The particular coin processing system 10 shown in FIG. 1 is a disk-type coin sorter for separating coins into individual denominations. Examples of coin sorters for use with the present invention are described in commonly owned U.S. Pat. Nos. 5,865,673; 6,039,644; and 6,042,470, which are incorporated herein by reference in their entireties.

While the present invention will be described in conjunction with the disk-type coin sorter illustrated in FIG. 1, the present invention is applicable to other types of coin sorters (e.g., rail-type coin sorters) as well as other coin processing machines (e.g., coin counters) that bag coins. Further, while the present invention will be described in conjunction with coins (i.e., government minted coins), the present invention is also applicable to other "coin-type" articles including transit tokens, game tokens, casino tokens, etc.

Coins to be sorted are received by a coin tray 14 of the coin sorter 10. According to the embodiment illustrated in FIG. 1, the coin tray 14 is perforated so that any smaller, potentially damaging debris included with the coins placed in the coin tray 14 are sifted out in order to prevent damage to the coin sorter 10. Further details and benefits of a perforated coin tray and well as other coin cleaning techniques (e.g., through the use of magnets) are described in commonly owned U.S. Pat. No. 4,964,494, which is incorporated herein by reference in its entirety. The coin tray 14 is attached to a housing 16 of the coin sorter 10 by way of a hinge 18 that allows the coin tray 14 to be rotated upward thus directing the coins, under the force of gravity, into the inlet 20 of the hopper (not shown) of the coin sorter 10.

Coins input to the coin sorter 10 are then sorted according to their variations in diameter of the various coin denominations. The components of the coin sorter 10 internal to the housing 16 are not shown, but will be generally described. The mixed coins are directed into the inlet 20 of the hopper when the coin tray 14 is lifted and coins pass though the hopper and then through an opening in an annular sorting head positioned within the housing 16 below the coin tray 14. As the coins pass through the central opening of the sorting head, they are deposited on the top surface of a rotatable disc. The rotatable disc comprises a resilient pad bonded to the top surface of a solid disc.

As the rotatable disc rotates, the coins deposited on the top surface thereof tend to slide outwardly across the surface of the pad of the rotatable disc due to the centrifugal force. As the coins move outwardly, those coins which are lying flat on the pad enter a gap between the upper surface of the pad and the sorting head because the underside of the inner periphery of the sorting head is spaced above the pad by a distance which is approximately as large as the thickness of the thickest coin. The coins are sorted into their respective denominations and discharged from an exit channels corresponding to their denominations. In general, coins for any given currency system are sorted by the variation in diameter of the various denominations.

Further details of how mixed coins are sorted as well as the operation of a coin sorter such as than depicted in FIG. 1 are described in U.S. Pat. Nos. 5,865,673; 6,039,644; and 6,042,470, which were incorporated by reference above.

The coin sorter 10, illustrated in FIG. 1, is capable of sorting up to nine different coin denominations. Such a coin sorter is useful in the casino environment where personnel deal with large quantities coins of several denominations (e.g., U.S. nickels, U.S. dimes, U.S. quarters, U.S. half-dollar coins, $1 casino tokens, $2 casino tokens, $5 casino tokens, $10 casino tokens) and in countries other than the United States that seven or more commonly used coins. Often, one of the exit channels is reserved for "undesirable" coins which can include, for example, U.S. pennies in a sorter designed to sort U.S. nickels, U.S. dimes, U.S. quarters, U.S. half-dollar coins, $1 casino tokens, $2 casino tokens, and $5 casino tokens.

As mentioned above, the coin sorter 10 shown in FIG. 1 has eight coin exit channels (not shown) for discharging sorter coins. Connected to each of the coin channels are coin bag clamps 31–39. Coins are discharged though a channel 40 disposed within each of the coin bag clamps 31–39. The coin bag clamps 31–39 are designed to securely hold a coin bag and to direct coins discharged from each of the exit channels into the respective coin bag. Commonly owned U.S. Pat. No. 6,131,625, which is incorporated herein by reference in its entirety, describes a coin bag clamping device which can be used in conjunction a coin processing device such as the coin sorter 10 depicted in the drawings.

Figure 3:
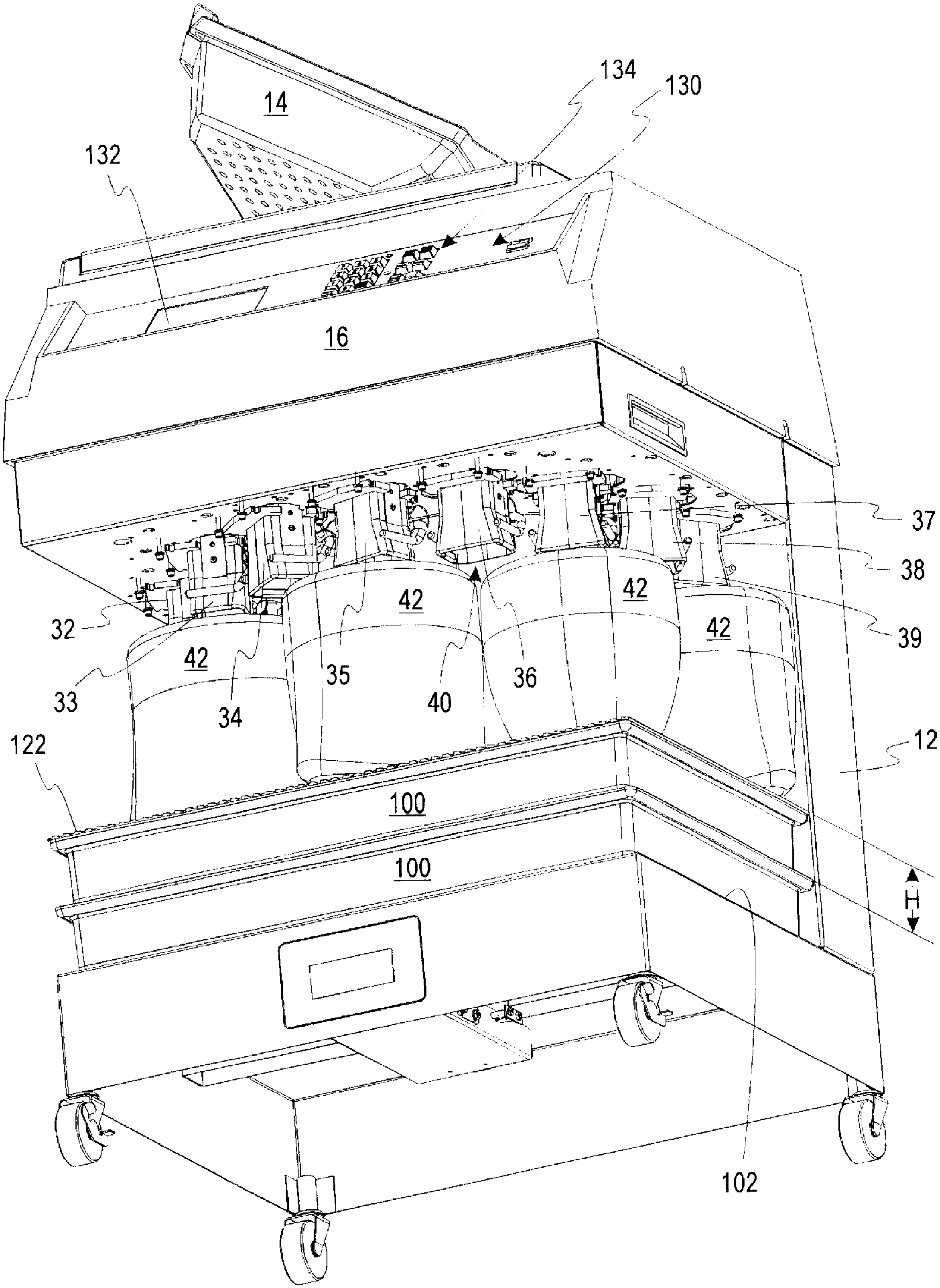
FIG. 3 is a perspective view of a coin sorter having a coin bag support system with coins bags disposed thereon according to one embodiment of the present invention.

Referring also to FIG. 3, coins sorted by the coin sorter 10 are discharged into a coin bag which is attached to each of the coin bag clamps. (Coin bags 42 are not shown attached to the coin bag clamps, but are shown for illustrative purposes. Further, in actual operation of the coin sorter 10, each coin bag clamps 31–39 would have a coin bag attached thereto; whereas, only a few coin bags 42 are depicted in FIG. 3.) Depending on the particular application involved, an operator of the coin sorter 10 uses different sized coin bags. For example, one application may require "Full Federal Bags," which require, for example, that 4000 quarters be deposited in each coin bag. Commonly, 19 inch coin bags (having a 12 inch square bottom) are used for "Full Federal Bags." Other applications require "Half-Full Federal Bags," which require, for example, that 2000 quarters be deposited in each coin bag. Commonly, 14 inch coin bags (have a 8.5 inch square bottom) are used for "Half-Full Federal Bags." Commonly used coin bag sizes coin bags include 19 inch (48.26 cm), 18 inch (45.72 cm), 17 inch (43.18 cm), 16 inch (40.64 cm), 15 inch (38.10 cm), 14 inch (35.56 cm), 13 inch (33.02 cm), and 12 inch (30.48 cm) bags. The dimension (e.g., 19 in 19 inch coin bag) refers to the approximate overall length of the bag.

As discussed in the background section, it is often necessary to support the bottom of the coin bags when the bags are being filled due to the sheer weight of the sorted coins filling the coin bags. Unsupported coin bags that are suspended from the coin bag clamps often tear as the bags become filled. Bag tearing can result in the spilling of the coins thus creating more work for an operator of the coin sorter 10. Additionally, unsupported coin bags can cause some types of coin processing systems (not shown) to topple over.

The coin sorter 10 is provided with a modular bag supporting platform(s) 100 for supporting the bottoms of coin bags. Generally, the modular platforms 100 can be stacked on a base 102 of the cabinet 12 to support coin bags of different lengths. Each of the platforms have a height H of approximately 2.75 inches (about 6.99 cm). The base 102 of the cabinet 12 is disposed a distance D1, approximately 18 inches (45.72 cm), from an underside 104 of the housing 16. Each of the coin bag clamping mechanisms have a length D2 of approximately 3 inches (7.62 cm). Approximately 1.25 inches (3.18 cm) of a coin bag will over lap each of the coin bag clamps 31–39 when the coin bag is attached. With the above dimensions in mind, Table 1 is a useful guide to an operator of the coin sorter 10 for determining the number of modular coin bag support platforms 10 to use.

TABLE 1

Number of Modular Coin Bag Support Platforms

| Overall Bag Length | Number of Coin Bag Support Platforms |
|---|---|
| 19 in (48.26 cm) | 0 |
| 18 in (45.72 cm) | 0 |
| 17 in (43.18 cm) | 1 |
| 16 in (40.64 cm) | 1 |
| 15 in (38.10 cm) | 1 |
| 14 in (35.56 cm) | 2 |
| 13 in (33.02 cm) | 2 |
| 12 in (30.48 cm) | 2 |

Therefore, according to Table 1, an operator using 12 inch coin bags would use two modular platforms 100 to support the bottom of the 12 inch coin bags. And an operator using 17 inch coin bags would use one modular platforms 100 to support the bottom of the 17 inch coin bags.

While the embodiment of the modular coin bag support platforms 100 discussed above and depicted in the drawings have a height of approximately 2.75 inches (about 6.99 cm), alternative modular coin support platforms 100 of most any height. The inventors have found that modular coin support platforms 100 having a height of approximately 2.75 inches (about 6.99 cm) have been successful in supporting the bottoms of coin bags to prevent the tearing of the coin bags while providing a limited number of platforms 100 to adapt the coin sorter 10 for use with several coin bag lengths. If the height of each of the platforms 100 was too small, a cumbersome number of supports may be required. In alternative embodiments, a coin bag supporting platform can have a height ranging between approximately 1.375 inches and approximately 5.5 inches.

Figure 4:
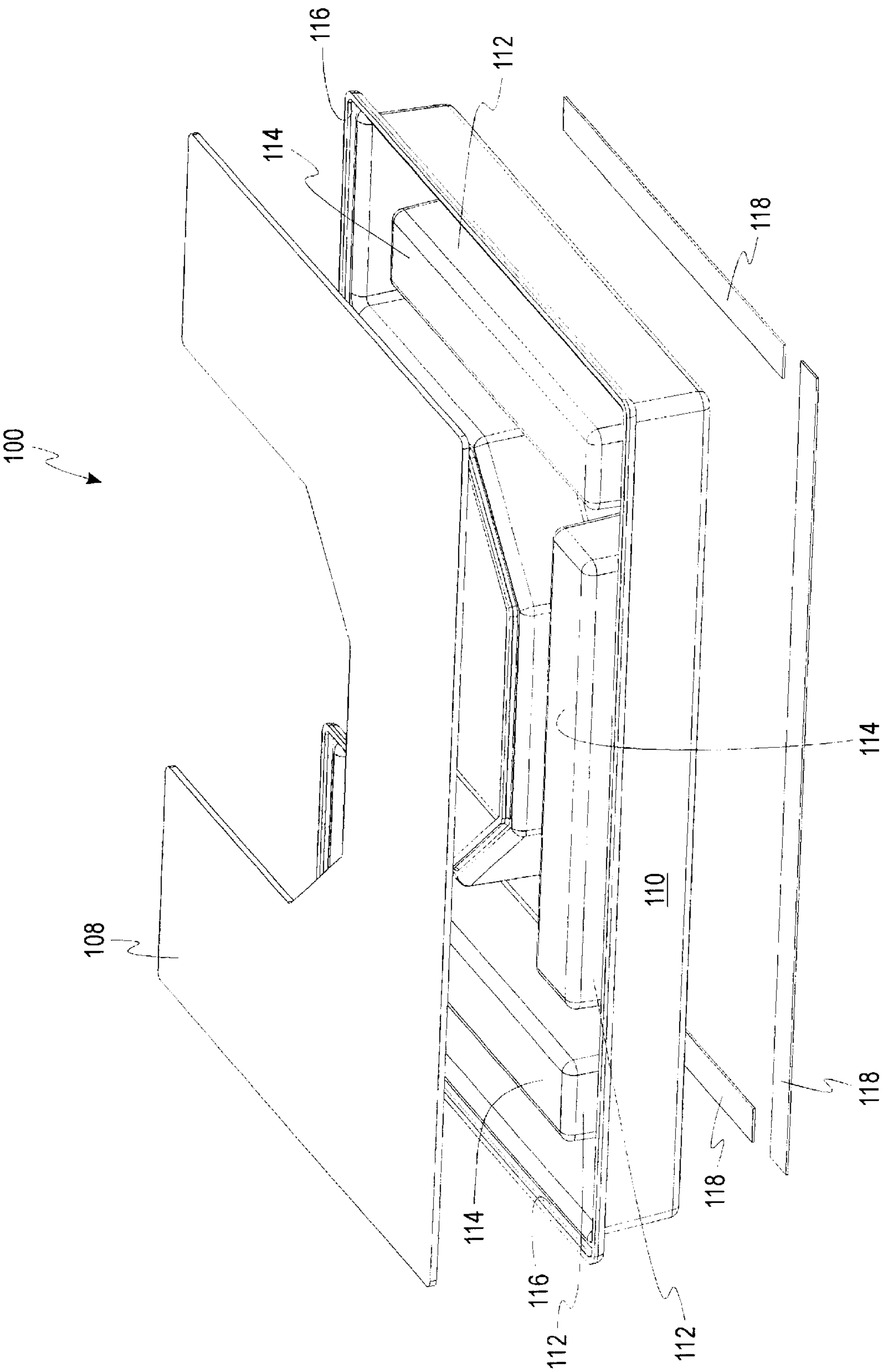
FIG. 4 is an exploded view of a coin bag support platform according to one embodiment of the present invention.

Referring also to FIG. 4, each of the platforms 100 are generally C-shaped allowing the platforms 100 to fit around a center support 106 of the coin cart 12. According to one embodiment, each of the platforms 100 has a two piece construction—a platform top 108 and a platform bottom 110. The top and bottom 108, 110 are made out of vacuumed formed ABS plastic. The platform bottom 110 is formed with integral stiffening ribs 112. Each of the integral stiffening ribs has a flat surface 114 that engages and supports the underside of the platform top 108 when the platform top 108 is laminated to the platform bottom 110. Additionally, the platform bottom 108 is formed with a lip 116 for engaging and supporting the underside of the platform top 108 when the platform top 108 is laminated to the platform bottom 110. Each of the platforms 100 optionally include several strips of foam tape 118 that are applied to the underside of the platform bottom 110. The foam tape 118 strips have sound deadening qualities as well as prevent slipping between adjacent platforms 100 or between the bottom-most platform and the base 102 of the cabinet 12. According to one embodiment, the foam tape strips 118 have adhesive placed on both sides to aid in securing the platform 100 to an adjacent platform 100 or the base 102.

The operation of the coin sorter 10 with coin bag supporting platforms 100 will now be described. An operator of the coin sorter 10 inputs a desired mode of operation via an operator interface 130 including a display 132 and keypad 134. For example, the operator may chose a mode of operation wherein mixed coins/tokens are sorted according to their denomination into coins bags so that the coin sorter 10 suspends operation after a predetermined number of coins have been sorted into any one of the coin bags at which time the display notifies the operator which coin bag is full. After selecting a mode of operation, the operator can then refer to Table 1 to determine how many, if any, modular coin bag support platforms 100 to use. In one embodiment, Table 1 is displayed on the display 132. For example, if the operator is using 19 inch coin bags, no platforms 100 would be needed. If the operator is using 16 inch coin bags, then one platform would be used; and if the operator is using 14 inch coin bags, then two platforms 100 would be used.

The operator installs the appropriate number of platforms by first removing an adhesive backing (not shown) from each of the foam tape strips 118. The platform 100, with the exposed adhesive facing down, is positioned around the center support 106 of the cabinet 12. The platform 100 is then lowered down onto the base 102 of the cabinet and pressed firmly onto the base 102. If a second platform 100 is required the above process is repeated so that a second coin platform 100 is installed on top of the first platform 100. Depending on how frequently an operator anticipates using different sized coin bags, the operator can optionally use tape strips 118 which to not adhere to the base or a lower platform thus facilitating the installation and subsequent removal of the platforms. Alternatively, Velcro® strips are used to hold the platform on the base 102 or another platform 100. For example, in an application requiring one platform 100, a Velcro® strip(s) would be placed on the underside of the platform 100 and corresponding Velcro® strips are placed on the base 100. Next, after the platform(s) are installed, a sound-deadening mat 122 is disposed on top of the upper-most platform 100. According to one embodiment, the sound-deadening mat 122 is made of rubber and has a corrugated upper surface upon which the bottoms of coins bags rest. The upper surface is corrugated to prevent coins bags from slipping off of the mat 122 and being made of rubber prevents the mat 122 from sliding off of the base 102.

After the platform(s) is installed, the operators places mixed coins into the coin tray 14 and starts the operation of the coin sorter. Optionally, the coin sorter tray 14 is coupled to a switch so that the coin sorter begins operation when the coin tray 14 is raised. Once the coin tray 14 is raised, the coins deposited therein move, under the force of gravity, through the inlet 20 of the hopper and into the coin sorter 10. The sorted coins are discharged from the coin sorter and directed into coins bags attached to the bag clamps 31–39. After a predetermined number of coins are directed into a coin bag, the operation of the coin sorter 10 is suspended so that an operator may remove the full coin bag and replace it with an empty coin bag until all of the coins are sorted.

According to an alternative embodiment of the present invention, a “stepped” coin bag support platform is provided for simultaneously supporting coin bags of different lengths. Such a stepped platform is stacked directly on the base 102 or upon a platform 100, which is shown in the drawings.

Figure 5A:
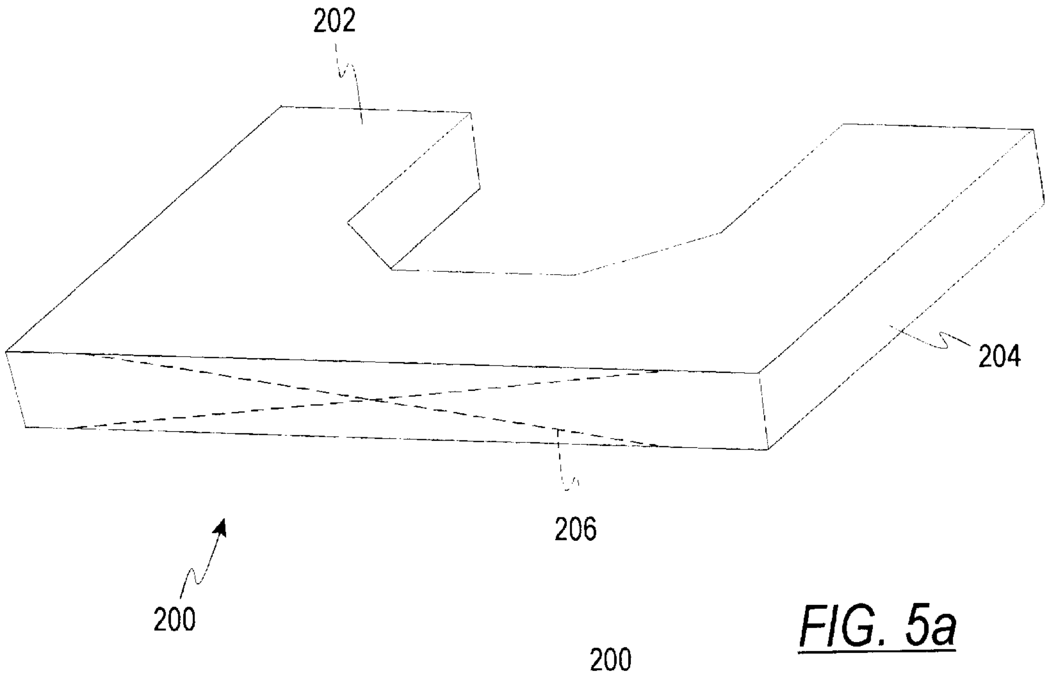
Figure 5B:
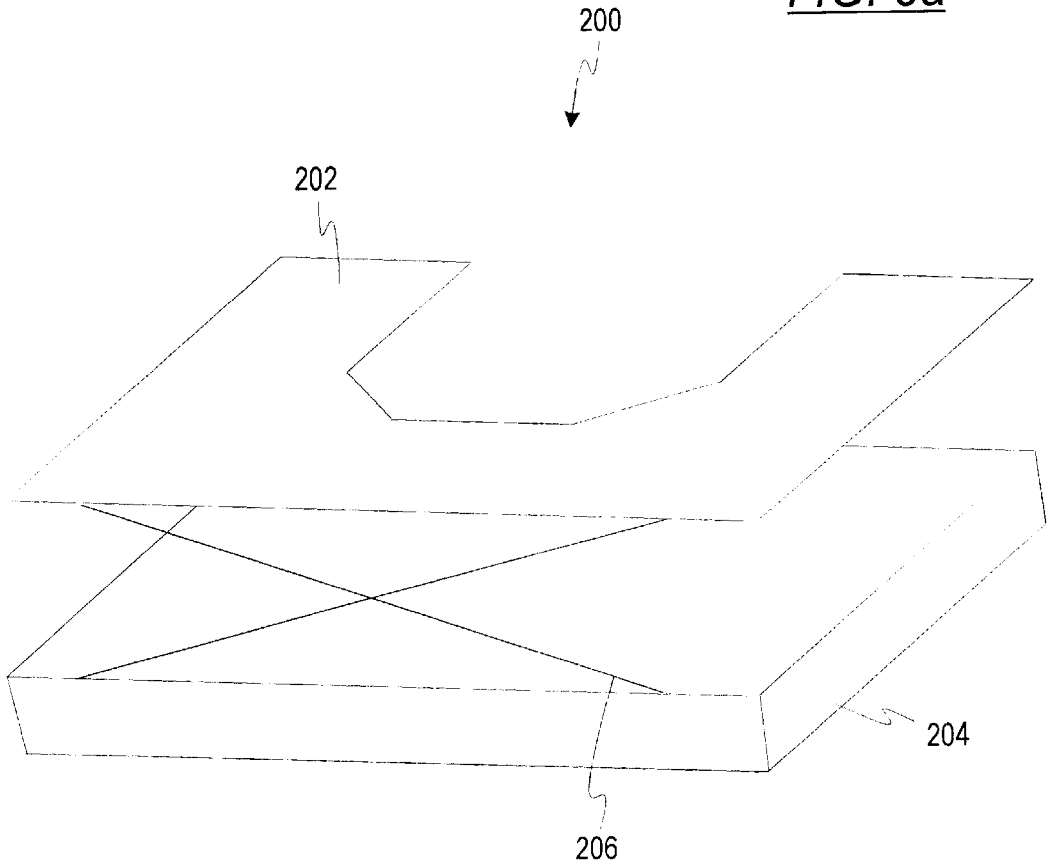

Referring now to FIGS. **5*a* and 5*b*, an alternative embodiment of a coin bag supporting system 200 is shown. The coin bag supporting systems 200 includes a bag supporting surface 202 that is automatically moveable between two or more bag supporting positions upon receipt of operator input. The bag supporting surface 202 is shown in a non-extended position in FIG. 5*a*, and in an extended position in FIG. 5*b*. The bag supporting system 200 includes a base 204. According to one embodiment, the base 204 is an integral part of the cart 12 (FIG. 1). According to another alternative embodiment, the base 204 is disposed on the surface 102 (FIG. 1). The bag supporting surface 202 is moved between two or more positions by an electric motor coupled to a structure 206 that moves and supports the bag supporting surface 202**.

Figure 6:
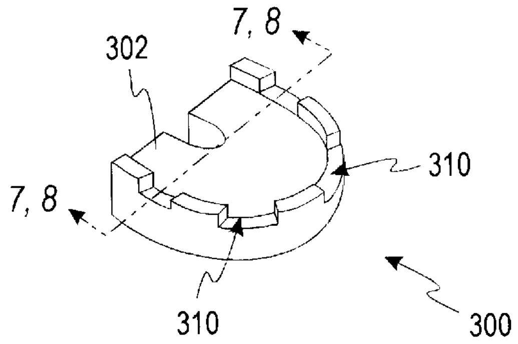
FIG. 6 is a perspective view of a coin bag support system according to an alternative embodiment of the present invention.
Figure 7:
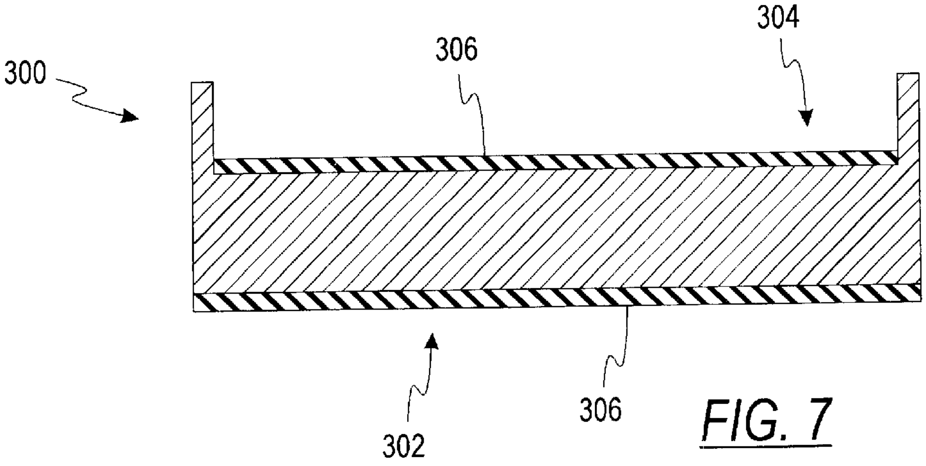
FIGS. 7 and 8 are cut-away views of the coin bag support system illustrated in FIG. 6.
Figure 8:
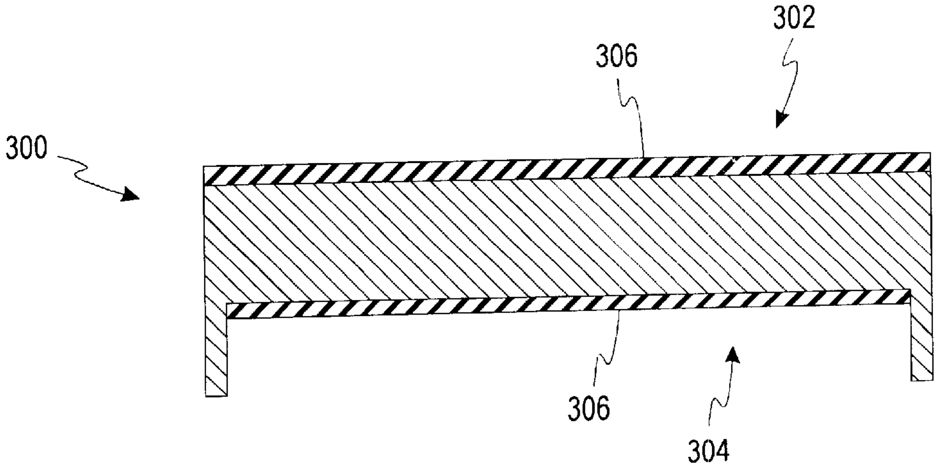

Referring now to FIGS. 6–8, another alternative embodiment of a coin bag supporting system 300 is shown. The coin bag supporting system 300 is placed on the surface 102 (FIG. 1). The coin bag supporting system 300 includes a first bag-support surface 302 for supporting coin bags having shorter lengths (e.g., 12 inch, 13 inch, and 14 inch coin bags) and a second bag-support surface 304 for supporting coin bags having medium lengths (e.g., 17 inch, 16 inch, and 15 inch coin bags). Both bag-supporting surfaces 302, 304 are optionally equipped with sound deadening material 306 similar to the sound deadening mat 122 (FIG. 1). The first bag-support surface 302 is disposed from the surface 102, when the supporting system 300 is placed on the surface 102, a distance of about 5.5 inches. The second bag-support surface 304 is disposed from the surface 102, when the supporting system 300 is placed on the surface 102, a distance of about 2.75 inches.

An operator rotates or “flips” the coin bag supporting system 300 to accommodate different sized coin bags. For example, an operator using 16 inch (40.64 cm) coin bags, places the coin bag supporting system 300 on the surface 102 such that the second bag-support surface 304 is facing upward, as shown in FIG. 7. The coin supporting system 300 contains slots 310 to allow an operator to more easily remove a filled coin bag from the second coin bag support-surface 304. The operator simply rotates the coin bag supporting system 300 over so that the first coin bag-support surface 302 is facing upward, as shown in FIG. 8, to accommodate smaller sized bags such as a 12 inch (30.48 cm) bag.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A coin sorter for sorting mixed coins of a plurality of denominations, the coin sorter comprising:

a inlet adapted to receive a plurality of coins to be sorted;

a sorting unit adapted to sort coins of a plurality of denominations according to denomination, the sorting unit having a plurality of outlet channels adapted to discharge sorted coins, each of the coin outlet channels corresponding to one of a plurality of denominations;

a coin bag corresponding to each of the plurality of outlet channels, each of the coin bags being adapted to receive coins discharged from each of the plurality of outlet channels; and a coin bag supporting system including at least one modular coin supporting platform adapted to vary the position of a coin bag supporting surface for supporting coin bags of different lengths.

2. The coin sorter of claim 1 further comprising a sound deadening mat disposed on the coin bag supporting surface.

3. The coin sorter of claim 1 wherein the at least one modular coin supporting platforms are made out of ABS plastic.

4. The coin sorter of claim 1 wherein the at least one modular coin bag supporting platform comprises:

a top member; and a bottom member having a plurality of stiffening ribs, each of the stiffening rights having a substantially flat surface adapted to support the top member.

5. The coin sorter of claim 4 wherein the bottom member has a lip formed around an outer periphery of the bottom member for supporting the top member.

6. The coin sorter of claim 1 wherein the at least one modular coin supporting platform is generally C-shaped.

7. The coin sorter of claim 1 wherein the at least one modular coin supporting platform comprises two coin supporting platforms.

8. The coin sorter of claim 7 wherein the two modular coins supporting platforms each have a height of about 2¾ inches.

9. The coin sorter of claim 1 wherein the at least one modular coin supporting platform has a height ranging between about 1.375 inches and about 5.5 inches.

10. The coin sorter of claim 1 further comprising a plurality of foam strips disposed on an underside of the at least one modular coin supporting platform.

11. The coin sorter of claim 1 further comprising a plurality of bag clamps corresponding to each of the plurality of coin outlet channels.

12. The coins sorter of claim 1 wherein the at least one modular coin supporting platform comprises a single modular coin supporting platform, and wherein the coin supporting platform has a stepped surface adapted to support coin bags of different lengths.

13. A coin sorting and collection system comprising:

a coin sorter adapted to sort coins of mixed denominations, the coin sorter including a plurality of coin outlet channels for discharging the sorted coins, the plurality of coin outlet channels corresponding to the plurality of coin denominations the sorter is capable of sorting;

at least one coin bag clamp coupled to each of the coin outlet channels, each of the plurality of coin bag clamps being adapted to hold a coin bag for receiving coins from each of the coin outlet channels;

a stand for supporting the coin sorter, the stand including a first coin bag supporting surface disposed a first distance from the coin bag clamps; and a plurality of modular coin bag support platforms for optionally stacking upon the first coin bag supporting surface, each of the modular coin bag support platforms being adapted to stack upon the first coin bag support service, each of the plurality of modular coin bag support platforms being adapted to stack upon another modular coin bag support platform, each of the plurality of coin bag support platforms including a coin bag supporting surface;

wherein the stacking of one or more modular bag coin support platforms upon the first coin bag supporting surface results in a second coin bag supporting surface disposed a second distance from the bag clamps, the second distance being less than the first distance.

14. The coin sorter of claim 13 further comprising a sound deadening mat disposed on an uppermost coin bag supporting surface.

15. The coin sorter of claim 13 wherein each of the plurality of modular coin bag supporting platforms are made out of ABS plastic.

16. The coin sorter of claim 13 wherein each of the plurality of modular coin bag supporting platforms comprise:

a top member; and a bottom member having a plurality of stiffening ribs, each of the stiffening rights having a substantially flat surface adapted to support the top member.

17. The coin sorter of claim 16 wherein the bottom member has a lip formed around an outer periphery of the bottom member for supporting the top member.

18. The coin sorter of claim 13 wherein each of the plurality of modular coin bag supporting platforms are generally C-shaped.

19. The coin sorter of claim 13 wherein the plurality of modular coin bag supporting platforms comprises two modular coin supporting platforms.

20. The coin sorter of claim 19 wherein each of the two modular coin supporting platforms have a height of about 2% inches.

21. The coin sorter of claim 13 wherein modular coin supporting platforms each have a height ranging between about 1.375 inches and about 5.5 inches.

22. The coin sorter of claim 13 further comprising a plurality of foam strips disposed on an underside of the modular coin supporting platforms.

23. The coin sorter of claim 13 further comprising a plurality of bag clamps corresponding to each of the plurality of coin outlet channels.

24. A method for supporting coins bags for use with a coin sorting device, the method comprising:

selecting a size of coin bag for collecting sorted coins;

determining the number of coin bag support platforms to be installed on the coin sorter, the number of coin bag support platforms corresponding to the selected coin bag size; and installing the determined number of coin bag support platforms.

25. The method of claim 24 wherein the coin sorter has a plurality of bag clamps, the method further comprising attaching a coin bag of the selected size to each of the plurality of bag clamps.

26. The method of claim 24 further comprising disposing a sound deadening mat on top of a coin bag supporting surface.

27. The method of claim 26 wherein determining further comprises referring to a chart displaying the number of coin bag support platforms corresponding to a plurality of coin bag sizes.

28. The method of claim 27 wherein referring further comprises referring to a chart electronically displayed on a display of an operator interface.

29. The method of claim 24 wherein installing further comprises removing a backing strip on each of a plurality of adhesive foam strips disposed on each of the coin bag support platforms.

30. A coin processing machine, comprising:

a coin processing region for processing coins;

a coin receiving region for receiving coins processed from the coin processing region, the coin receiving region including a bag clamping mechanism for holding a coin bag and a bag-support surface located below the bag clamping mechanism; and a modular coin bag supporting device to be positioned on the bag-support surface.

31. The coin processing machine of claim 30 wherein the coin receiving region is disposed a first distance from the bag-support surface, the modular coin bag supporting device being disposed a second distance from the coin receiving region when placed on the bag-support surface, the second distance being less than the first distance.

32. The coin processing machine of claim 31 wherein the first distance ranges between about 14 inches and about 22 inches.

33. The coin processing machine of claim 31 wherein the modular coin bag supporting device having a height ranging between about 1.375 inches and about 5.5 inches.

34. The coin processing machine of claim 30 wherein the coin processing machine is a coin sorter.

* * * * *